United States Patent
Maeda

(10) Patent No.: US 7,047,389 B2
(45) Date of Patent: May 16, 2006

(54) MEMORY ALLOCATION METHOD AND COMPUTER READABLE MEDIUM

(75) Inventor: Masayuki Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 292 days.

(21) Appl. No.: 10/374,554

(22) Filed: Feb. 25, 2003

(65) Prior Publication Data
US 2003/0188120 A1    Oct. 2, 2003

(30) Foreign Application Priority Data
Mar. 28, 2002 (JP) .............................. 2002-091978

(51) Int. Cl.
*G06F 12/00* (2006.01)
(52) U.S. Cl. ...................................... 711/171; 711/170
(58) Field of Classification Search ................ 711/170, 711/171, 150
See application file for complete search history.

(56) References Cited

U.S. PATENT DOCUMENTS 6,338,125 B1 * 1/2002 Kopser et al. ............... 711/150
6,701,420 B1 * 3/2004 Hamilton et al. ............ 711/170

* cited by examiner

Primary Examiner—Reginald G. Bragdon
Assistant Examiner—Craig E Walter
(74) Attorney, Agent, or Firm—Greer, Burns & Crain, Ltd.

(57) ABSTRACT

The present invention provides a memory allocation method and the like, meaning that user usability and the level of service for the user can be improved. The present invention is a method for allocating memory to an application, wherein in cases where, upon receiving a memory acquisition request, the required size cannot be acquired even by executing memory recovery processing, a judgment is made of whether or not a generated memory shortage state is temporary on the basis of memory recovery information relating to past memory recovery processing, and the required size requested; when the memory shortage state is judged to be temporary, in principle, rather than immediately performing error processing, an attempt is made to acquire memory by performing memory recovery processing once again after a predicted wait time determined on the basis of the memory recovery information and the required size has elapsed.

10 Claims, 6 Drawing Sheets

FIG. 6

| MAXIMUM RECORDING FREQUENCY | LOCATION FOR NEXT RECORDING |
|---|---|
| 5 | second ← R |

| | ELAPSED TIME SINCE ACTIVATION | ELAPSED TIME SINCE PREVIOUS GC | MEMORY AMOUNT RECOVERED IN GC |
|---|---|---|---|
| Q → | 100 seconds | 100 seconds | 20 MB |
| | 0 | 0 | 0 |
| | 0 | 0 | 0 |
| | 0 | 0 | 0 |
| | 0 | 0 | 0 |

FIG. 7

| MAXIMUM RECORDING FREQUENCY | LOCATION FOR NEXT RECORDING |
|---|---|
| 5 | first ← T |

| | ELAPSED TIME SINCE ACTIVATION | ELAPSED TIME SINCE PREVIOUS GC (U) | MEMORY AMOUNT RECOVERED IN GC (V) |
|---|---|---|---|
| | 100 seconds | 100 seconds | 20 MB |
| | 200 seconds | 100 seconds | 20 MB |
| | 300 seconds | 100 seconds | 20 MB |
| | 350 seconds | 50 seconds | 10 MB |
| S → | 400 seconds | 50 seconds | 10 MB |

FIG. 8

| MAXIMUM RECORDING FREQUENCY | LOCATION FOR NEXT RECORDING |
|---|---|
| 5 | second ← X |

| | ELAPSED TIME SINCE ACTIVATION | ELAPSED TIME SINCE PREVIOUS GC | MEMORY AMOUNT RECOVERED IN GC |
|---|---|---|---|
| W → | 455 seconds | 55 seconds | 20 MB |
| | 200 seconds | 100 seconds | 20 MB |
| | 300 seconds | 100 seconds | 20 MB |
| | 350 seconds | 50 seconds | 10 MB |
| | 400 seconds | 50 seconds | 10 MB |

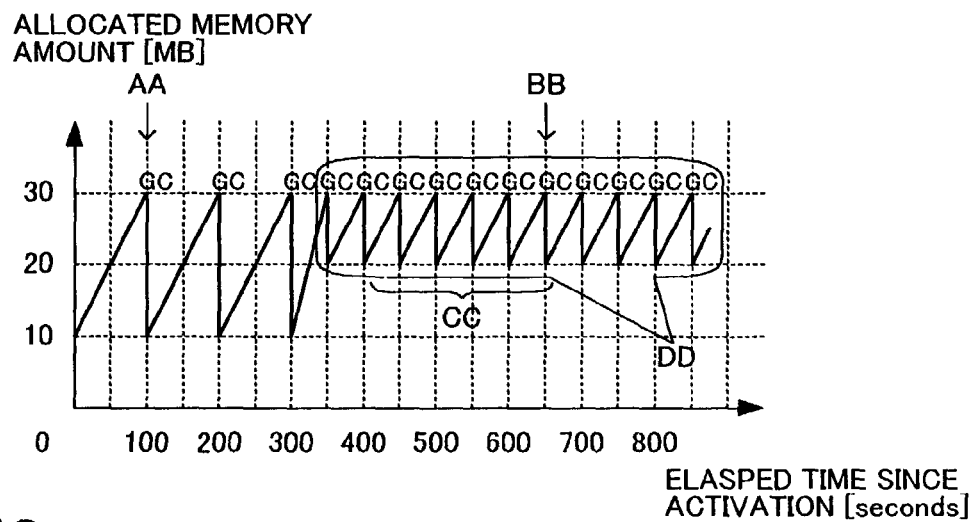

| MAXIMUM RECORDING FREQUENCY |
|---|
| 5 |

| LOCATION FOR NEXT RECORDING |
|---|
| second | ← FF |

|  | ELAPSED TIME SINCE ACTIVATION | ELAPSED TIME SINCE PREVIOUS GC | MEMORY AMOUNT RECOVERED IN GC |
|---|---|---|---|
| EE → | 100 seconds | 100 seconds | 20 MB |
|  | 0 | 0 | 0 |
|  | 0 | 0 | 0 |
|  | 0 | 0 | 0 |
|  | 0 | 0 | 0 |

FIG. 11

| MAXIMUM RECORDING FREQUENCY |
|---|
| 5 |

| LOCATION FOR NEXT RECORDING |
|---|
| first | ← HH |

|  | ELAPSED TIME SINCE ACTIVATION | ELAPSED TIME SINCE PREVIOUS GC (II) | MEMORY AMOUNT RECOVERED IN GC (JJ) |
|---|---|---|---|
|  | 450 seconds | 50 seconds | 10 MB |
|  | 500 seconds | 50 seconds | 10 MB |
|  | 550 seconds | 50 seconds | 10 MB |
|  | 600 seconds | 50 seconds | 10 MB |
| GG → | 650 seconds | 50 seconds | 10 MB |

MEMORY ALLOCATION METHOD AND COMPUTER READABLE MEDIUM

BACKGROUND OF THE INVENTION

1. Field of the Invention

The present invention relates to a method for allocating memory in a computer, and more particularly to a method for allocating memory, and the like, when a memory shortage state is generated.

2. Description of the Related Art

Normally, when an application is run on a computer, after the program of this application has been read to memory, processing is executed in accordance with this program. Therefore, in response to a request to run this application, processing is performed in which memory management software allocates memory of the required capacity to this application.

Then, once this allocation has taken place, even if the allocated memory area is not required by the application, because the fact that this area may be recovered is not communicated on each occasion to the memory management software, the free capacity of the memory is normally reduced each time a request to run an application is made, and this ultimately leads to the generation of a memory shortage state.

When such a memory shortage is generated, the memory management software typically executes GC (garbage collection) processing. Such processing searches for and locates sections of the memory in an unused state from those sections of the memory which have already been allocated, and then recovers these memory sections. Such processing makes it possible to increase the free capacity of the memory. The above-described allocation of memory to an application can thus be repeated.

Such a memory management function is implemented by software such as JavaVM (Java Virtual Machine), for example. JavaVM is software which is situated in an OS and in a Java (Registered Trademark of Sun Microsystems Inc., likewise hereinafter) program and which, in addition to comprising a memory management function, also comprises functions for performing thread management, method management, byte code execution, and the like. JavaVM is widely employed in servers that supply services to a plurality of clients over the Internet and other such servers.

FIG. 12 illustrates a conventional memory allocation method performed by such memory management software. First of all, a memory acquisition request is received on the basis of an application execution request by the user (step S21 of FIG. 12) Next, a check is made as to whether or not there is free capacity in the memory that adequately satisfies the required size pertaining to the memory acquisition request (step S22 of FIG. 12). As a result, when a free capacity that adequately satisfies this request exists ("Yes" in step S22 of FIG. 12), memory corresponding to the required size is acquired, and the start address is communicated to the application (step S26 of FIG. 12).

On the other hand, when an adequate memory free capacity does not exist ("No" in step S22 of FIG. 12), the above-described GC processing is executed to recover unused memory (step S23 of FIG. 12). Then, because of the resulting increase in the free capacity of the memory, the free capacity of the memory is checked once again (step S24 of FIG. 12). Here, processing like that of step S22 described above is performed, and in cases where free capacity that adequately satisfies the required size has been obtained ("Yes" in step S24 of FIG. 12), memory corresponding to the required size is acquired and the memory start address is communicated to the application (step S26 of FIG. 12).

Also, when it has not been possible to obtain an adequate free memory capacity ("No" in step S24 of FIG. 12), error processing is performed (step S25 of FIG. 12). That is, the acquisition of memory corresponding to the required size is abandoned, a message to the effect that there is a memory shortage is outputted to the application, and the application is terminated.

As described hereinabove, in conventional memory allocation methods, in the event of a memory shortage state following GC processing, error processing is performed and the application in question is terminated, irrespective of the reason for the memory shortage or the specific status thereof, and so forth. Therefore, in a case such as this, the user is unable to use the application and either abandons usage of the application or makes another usage request.

However, the memory shortage state described above also includes a chronic memory shortage state and a temporary memory shortage state, and because, in the conventional method described above, error processing is immediately performed irrespective of which of these states exists, the following problems are known.

Where the chronic memory shortage state is concerned, because a free capacity satisfying the size required cannot be regularly secured and the probability of memory acquisition is low even over time, the immediate execution of error processing, as performed conventionally, is reasonable.

However, the temporary memory shortage state is one in which, although memory of the required size can be regularly secured, it is temporarily impossible to secure the memory for any reason, and, in such a case, there is the possibility that it will be possible to secure memory of the required size by waiting a short while. It is therefore not advisable to immediately perform error processing to stop the application in question, as was the case conventionally, in the temporary memory shortage state too.

Even if a state that permits usage upon waiting a short while exists, this fact is not known to the user, and hence a user confronted by such error processing will therefore sometimes abandon usage, and thus miss out on a usage opportunity. Also, a user that does not abandon usage but instead, following error processing, repeats the operation to request usage many times over, is able to use the application after a short time has elapsed. However, because a previously inputted value is reset each time error processing takes place, there is a requirement to perform the input operation from the beginning each time the usage request operation is performed, which is inconvenient.

For example, on a Web site that provides a Web service targeting the general public such as "hotel reservations", "computer price estimates", or the like, because it is hoped that users visiting this Web site will use such a service as much as possible, the above-described memory shortage state is not preferable in that the opportunity to supply the service is lost and usability for users is poor. Moreover, due to the rapid popularization of the Internet in recent times, the number of users gaining access to such a service is increasing and the environment is increasingly becoming one in which memory shortage states are readily generated. A countermeasure is therefore preferable such that, even if a memory shortage state is generated, error processing is not always performed as it was conventionally, but, instead, an application is allowed to continue running wherever possible in cases of temporary memory shortage.

SUMMARY OF THE INVENTION

It is accordingly an object of the present invention to provide a memory allocation method and the like such that when an application usage request is made by the user, even in the event of a memory shortage, error handling is not always performed, meaning that user usability and the level of service for the user can be improved.

In order to achieve the above object, one aspect of the present invention is a method for allocating memory to an application, wherein in cases where, upon receiving a memory acquisition request, the required size cannot be acquired even by executing memory recovery processing, a judgment is made of whether or not a generated memory shortage state is temporary on the basis of memory recovery information relating to past memory recovery processing, and the required size requested; when the memory shortage state is judged to be temporary, rather than immediately performing error processing, an attempt is made to acquire memory by performing memory recovery processing once again after a predicted wait time determined on the basis of the memory recovery information and the required size has elapsed. Therefore, according to the present invention, in a state of temporary memory shortage, in principle, error processing is not performed instantly as was the case conventionally, and memory can sometimes be acquired by waiting a short while. It is thus possible to reduce instances where a user wishing to use an application abandons usage, or performs a repeated usage request operation, and so forth, whereby user usability as well as the level of service for the user can be improved.

In order to achieve the above object, another aspect of the present invention is a memory allocation method for allocating memory in accordance with a memory acquisition request which allocates memory of a required size determined by the request, wherein in cases where, upon receiving the memory acquisition request, memory of the required size cannot be acquired even by executing memory recovery processing to recover unused memory, the memory allocation method comprises: a first step of judging whether or not to retry the memory acquisition on the basis of memory recovery information relating to past memory recovery processing, and the required size; a second step of communicating the fact that the memory cannot be acquired to a request source of the memory acquisition request when a judgment is made to not retry the memory acquisition; and a third step of executing the memory recovery processing once again after a predetermined time interval has elapsed to thereby retry the memory acquisition when a judgment is made to retry the memory acquisition.

In order to achieve the above object, yet another aspect of the present invention is a memory allocation method for allocating memory in accordance with a memory acquisition request which allocates memory of a required size determined by the request, wherein, in cases where memory of the required size cannot be acquired at the point when the memory acquisition request is received, the memory allocation method comprises: a first step of executing memory recovery processing to recover unused memory; a second step of judging whether or not it is possible to acquire memory of the required size after the first step; a third step of acquiring memory of the required size when a judgment is made in the second step that the memory can be acquired; a fourth step of judging whether or not to retry the memory acquisition on the basis of memory recovery information relating to past memory recovery processing, and the required size, when a judgment is made in the second step that memory cannot be acquired; a fifth step of communicating the fact that the memory cannot be acquired to a request source of the memory acquisition request when a judgment is made in the fourth step to not retry the memory acquisition; and a sixth step of repeating the processing starting from the first step after a predetermined time interval has elapsed, when a judgment is made in the fourth step to retry the memory acquisition.

Furthermore, in a preferred embodiment of the above invention, the memory recovery information includes the executed time of the memory recovery processing, and the memory recovery amount; the fourth step comprises a predicting step of determining a expected memory recovery time until the next memory recovery processing will be performed, on the basis of the executed time of the memory recovery information, and determining a predicted wait time permitting memory of the required size to be acquired, on the basis of the memory recovery information and the required size, and a judging step of judging whether or not to retry the memory acquisition on the basis of the expected memory recovery time and the predicted wait time; and the predetermined time interval in the sixth step is the predicted wait time.

In order to achieve the above object, another aspect of the present invention is a computer readable medium recording a program that causes a computer to execute processing to allocate memory in accordance with a memory acquisition request which allocates memory of a required size determined by the request, wherein, in cases where memory of the required size cannot be acquired at the point when the memory acquisition request is received, said processing comprising: a first step of executing memory recovery processing to recover unused memory; a second step of judging whether or not it is possible to acquire memory of the required size after the first step; a third step of acquiring memory of the required size when a judgment is made in the second step that the memory can be acquired; a fourth step of judging whether or not to retry the memory acquisition on the basis of memory recovery information relating to past memory recovery processing, and the required size, when a judgment is made in the second step that memory cannot be acquired; a fifth step of communicating the fact that the memory cannot be acquired to a request source of the memory acquisition request when a judgment is made in the fourth step to not retry the memory acquisition; and a sixth step of repeating the processing starting from the first step after a predetermined time interval has elapsed, when a judgment is made in the fourth step to retry the memory acquisition.

Further objects and characteristics of the present invention will become apparent from an embodiment of the invention which is described hereinbelow.

BRIEF DESCRIPTION OF THE DRAWINGS

FIG. 6 shows an example of the GC information table 21;

FIG. 7 shows an example of the GC information table 21;

FIG. 8 shows an example of the GC information table 21;

FIG. 9 shows another example of a variation in the allocated memory amount of the business task server 1;

FIG. 10 shows an example of the GC information table 21;

FIG. 11 shows an example of the GC information table 21; and

DESCRIPTION OF THE PREFERRED EMBODIMENTS

Figure 1:
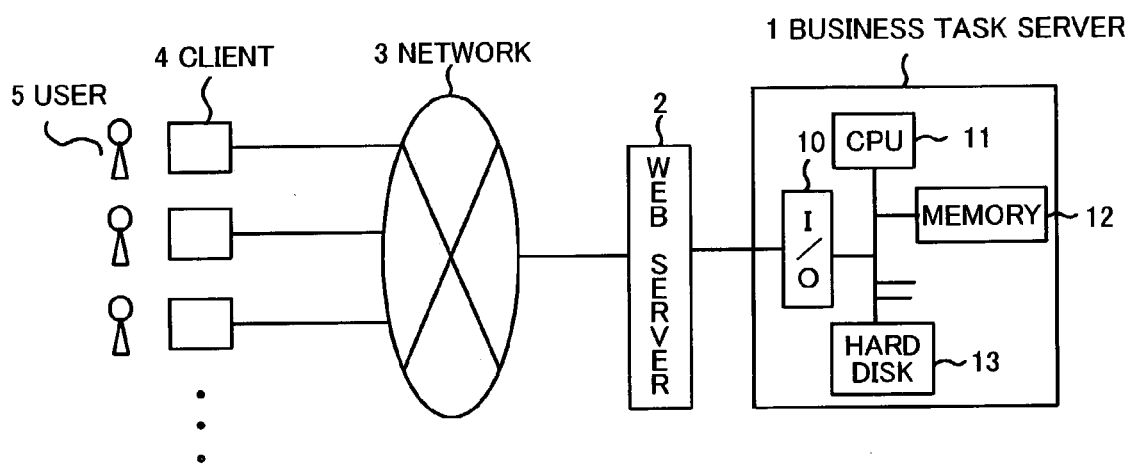
FIG. 1 is a constitutional view of a network according to an embodiment of a business task server that employs the memory allocation method according to the present invention.

An embodiment of the present invention will be described below by referring to the drawings. However, such an embodiment does not limit the technological scope of the present invention. The description is made by assigning the same reference numerals or reference symbols to those elements in the figures which are the same or analogous.

Figure 2:
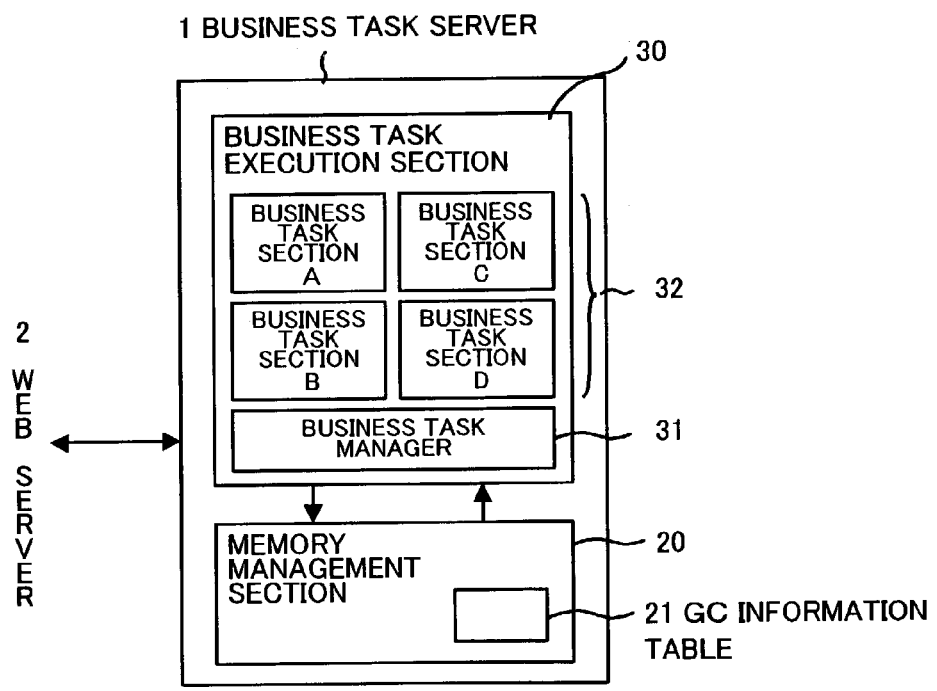
FIG. 2 shows the constitution of the business task server 1 shown in FIG. 1 in terms of the functions thereof.

FIG. 1 is a constitutional view of a network according to an embodiment of a business task server that employs the memory allocation method according to the present invention. FIG. 2 shows the constitution of the business task server 1 shown in FIG. 1 in terms of the functions thereof. As shown in FIG. 1, the business task server 1 according to this embodiment is a server that is connected to a plurality of clients 4 via a Web server 2 and network 3 such as the Internet. Predetermined application services (referred to as business tasks hereinafter) such as "hotel reservations", "computer price estimates", and so forth) are supplied to a plurality of users 5.

As shown in FIG. 1, the hardware of the business task server 1 comprises an I/O 10, which is an input/output interface, a CPU 11, a memory 12, and a hard disk 13, and the like, similarly to an ordinary computer system. Programs for executing the business tasks provided by the business task server 1 are stored on the hard disk 13 and the like, and read to the memory 12 at run time, and the CPU 11 executes the actual processing in accordance with these programs.

A user 5 wishing to employ a business task provided by the business task server 1 accesses the Web site of the business task server 1 via a client 4 such as a personal computer and makes a usage request for the business task he or she wishes to use. The business task server 1, having received this request, allocates the memory necessary for the required business task for use by the business task in the memory 12, executes processing in accordance with the request by the user 5, and sends back the processing result to the client 4 of the user 5.

Further, as shown in FIG. 2, the business task server 1 is constituted comprising, from the perspective of functionality, a memory management section 20 and a business task execution section 30. The business task execution section 30 is constituted by a business task manager 31 and business task sections 32 (business task section A, business task section B, and so on), the business task sections 32 being the parts that actually execute the business tasks. The business task manager 31 performs overall management of the business tasks of the business task sections 32, namely operations to check the business task activation and stop states of the business task sections 32, and to reactivate business tasks in a stop state. Such a business task execution section 30 is implemented by programs for executing the business tasks, a hard disk 13 for storing these programs, a memory 12, and a CPU 11 for executing processing in accordance with the programs.

The memory management section 20 is a part that executes memory allocation processing in response to a request from the business task execution section 30, and the memory allocation method according to the present invention is employed by this part. The specific details of the memory allocation processing will be provided subsequently, but the memory management section 20 performs processing to acquire memory required by the business task sections 32, and to recover memory in an unused state (GC processing), and the like.

As shown in FIG. 2, the GC information table 21 is in the memory management section 20, and information relating to past GC processing is held in this table. The specific details will be provided subsequently. The GC information (memory recovery information) of the CC information table 21 is used in the memory allocation processing performed by the memory management section 20.

The memory management section 20 is implemented by a program for executing memory allocation processing and the like, as well as by the CPU 11 that executes processing in accordance with this program. The GC information table 21 is also resident in the memory 12. The functions of the memory management section 20 may be implemented as some of the above-described JavaVM functions, for example.

In the event of a business task usage request from the user 5, the business task server 1 according to the present embodiment, which is constituted as described above, does not refuse usage by the user 5 by immediately performing error processing, even if a memory shortage state is generated, but, instead, makes a judgment of whether or not the memory shortage state generated is temporary. When the memory shortage state is temporary, wherever possible, the business task server 1 attempts to render a state in which the user 5 is able to use the application as is.

Figure 3:
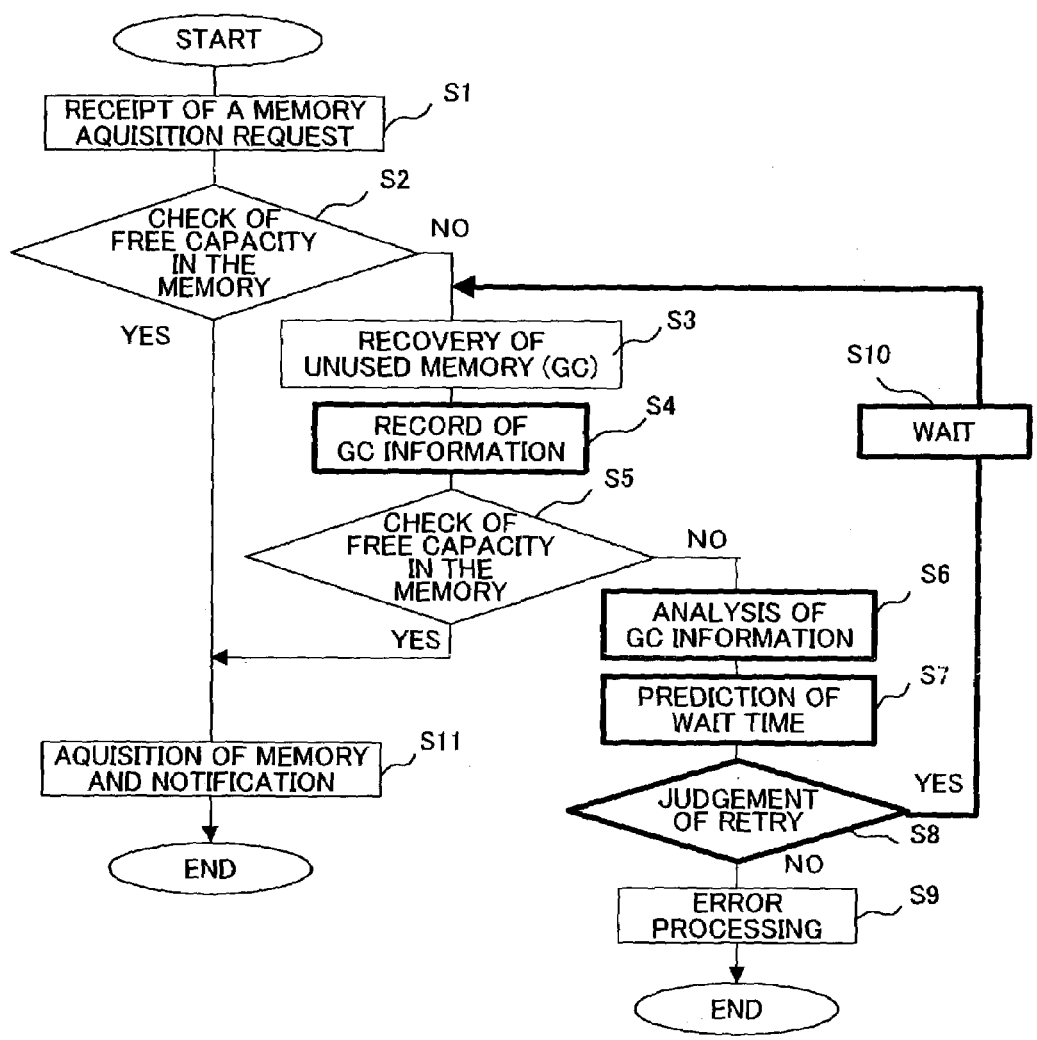
FIG. 3 is a flowchart showing an example of memory allocation processing as performed by a memory management section 20 of the business task server 1 according to this embodiment.

FIG. 3 is a flowchart showing an example of memory allocation processing as performed by the memory management section 20 of the business task server 1 according to this embodiment. The specific details of the memory allocation processing performed by the memory management section 20 will be provided below on the basis of FIG. 3. First, a business task usage request is made by the user 5 via the client 4, the network 3, and the Web server 2, and the request is received by the business task execution section 30 of the business task server 1. Then, a business task section 32 (business task section A, for example), which executes the business task relating to this request, makes a memory acquisition request to the memory management section 20 to the effect that there is a desire to acquire the memory required in order to execute processing in accordance with this request.

The memory management section 20 receives this memory acquisition request (step S1 of FIG. 3), and checks whether or not the required memory size to be acquired, which is contained in the memory acquisition request, can be immediately acquired (step S2 of FIG. 3). Specifically, the memory management section 20 checks if there is free capacity that satisfies the required size in the memory 12, and, if there is such free capacity, also checks that, following allocation of the required memory size, the proportion of the allocated part of the memory in relation to the overall memory capacity does not exceed a threshold value (80%, for example).

Here, when both such conditions are satisfied, that is, in cases where there is free capacity that satisfies the required size and when, following allocation, the proportion of the allocated part of the memory in relation to the overall memory capacity does not exceed a threshold value, the judgment is made that immediate memory acquisition is possible ("Yes" in step S2 of FIG. 3), memory corresponding to the required size is acquired in the memory 12, the start address of the acquired memory is communicated to the business task execution section 30 (step S11 of FIG. 3). In the business task execution section 30, the business task section 32 that made the memory acquisition request uses the allocated memory to execute processing for the request by the user 5. Thus, in this case, the service is executed correctly for the user 5.

On the other hand, in cases where the above conditions are not satisfied in step S2, that is, there is no free capacity satisfying the required size or, even if there is such free capacity, where, following allocation, the proportion of the allocated part of the memory in relation to the overall memory capacity exceeds the threshold value ("No" in step S2 of FIG. 3), GC processing is executed and unused memory are recovered, whereby the free capacity is increased (step S3 of FIG. 3).

Figure 4:
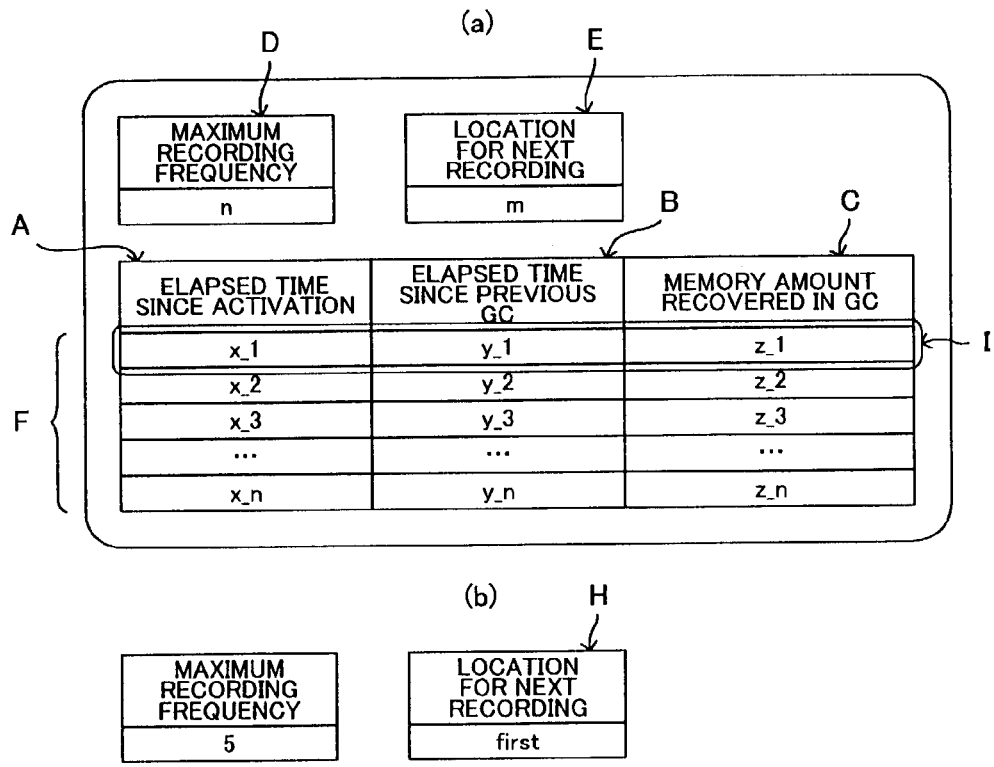
FIG. 4 illustrates a GC information table 21.

Next, the GC information pertaining to the above-mentioned GC processing thus carried out is recorded in the above-mentioned GC information table 21 (step S4 of FIG. 3). FIG. 4 illustrates the GC information table 21. FIG. 4(a) shows a constitutional example of the GC information table 21 and FIG. 4(b) shows a specific example with actual values entered therein. The GC information recorded in the GC information table 21 is made up from "elapsed time since activation" (section A in FIG. 4(a)), "elapsed time since previous GC" (section B in FIG. 4(a)) and "memory amount recovered in GC" (section C in FIG. 4(a)), the information shown in section I of FIG. 4(a) constituting one item of GC information, for example. Such GC information is added to the GC information table 21 each time GC processing is performed in step S3.

Further, "elapsed time since activation" is intended to mean the elapsed time since activation of the business task server 1 until GC processing is performed on this occasion. "Elapsed time since previous GC" is intended to mean the elapsed time since when the previous GC processing was performed until GC processing is performed on this occasion. Further, "memory amount recovered in GC" is intended to mean the memory capacity recovered in GC processing on this occasion.

The recording frequency for GC information is a number recorded as "maximum recording frequency" (section D in FIG. 4(a)), and from the time when the frequency of GC processing exceeds the maximum recording frequency, information is deleted (overwritten) starting with the oldest information so that new GC information is continually recorded. Because the "maximum recording frequency" in FIG. 4(a) is "n", GC information pertaining to n times' worth of GC processing working backward from the GC processing just performed (n times' worth including the previous GC processing) is recorded (section F in FIG. 4(a)). The "location for next recording" (section E in FIG. 4(a)) indicates the location for recording GC information when the next GC processing is performed. In the example shown in FIG. 4(a), this value is "m", and hence the next recording is made in the mth location from the top in the section F in FIG. 4(a). This value is incremented in steps of one each time recording is performed, restored to "1" when the "maximum recording frequency" is exceeded, and incremented in steps of one thereafter.

FIG. 4(b) shows a specific example of GC information table 21. In this example, five items of GC information are recorded in accordance with the "maximum recording frequency". Assuming that GC processing as performed in the above-described step S3 of FIG. 3 is carried out 500 seconds after activation of the business task server 1, the recording shown in section G in FIG. 4(b) is performed in step S4 of FIG. 3. Then, in this case, with regard to the "location for the next recording" (section H in FIG. 4(b)), because the location at which the recording is now made is the fifth and adding 1 thereto causes the "5" of the "maximum recording frequency" to be exceeded, this value is restored to 1 on the basis of the rule described above, thus rendering "first".

Returning now to FIG. 3, when the recording of the GC information to the GC information table 21 described above is complete (step S4 of FIG. 3), a check is made once again of whether it is possible to acquire memory of the received required size (step S5 of FIG. 3). Here, the check and judgment performed are like the check and judgment performed in the above-described step S2.

As a result, in cases where the judgment is made that memory can be acquired ("Yes" of step S5 of FIG. 3), memory corresponding to the required size is acquired in the memory 12, and the start address of the acquired memory is communicated to the business task execution section 30 (step S11 of FIG. 3). In such a case, as detailed earlier, the business task section 32 that made the memory acquisition request uses the allocated memory to execute the processing for the request from the user 5. Therefore, in this case also, the service is executed correctly for the user 5.

On the other hand, in cases where the judgment is made that memory cannot be acquired ("No" in step S5 of FIG. 3), that is, when memory cannot be acquired even following GC processing and a so-called memory shortage state exists, a judgment is made of whether this memory shortage state is a temporary or chronic one. Here, a temporary memory shortage state indicates a state where it appears possible to acquire memory upon waiting for a short time(for between a few seconds and several tens of seconds, for example), and a chronic memory shortage state indicates a state where it does not appear possible to acquire memory even by waiting.

Specifically, GC information analysis is initially performed (step S6 of FIG. 3). In such analysis processing, the average recovered memory amount and the average GC time interval are calculated from GC information recorded in the GC information table 21. The average recovered memory amount is the expected memory recovery amount per second, and is calculated from the "elapsed time since previous GC" (section B in FIG. 4(a)) and "memory amount recovered in GC" (section C in FIG. 4(a)) of past GC processing which are recorded in the GC information table 21. More specifically, the average recovered memory amount is determined by dividing the total of the values recorded in the field "memory amount recovered in GC" of the GC information table 21 by the total of the values recorded in the field "elapsed time since previous GC". For example, in the example shown in FIG. 4(b), the average recovered memory amount is 0.14 MB per second, which is found by the calculation:

$$(10+10+20+15+15)/(100+50+100+150+100).$$

Further, the average GC time interval is the expected time (expected memory recovery time) until the next GC processing is performed after GC processing, and is calculated from "elapsed time since previous GC" (section B of FIG. 4(a)) of past GC processing, which is recorded in the GC information table 21. More specifically, the average GC time interval is determined by calculating the average of values recorded in the field "elapsed time since previous GC" of the GC information table 21. For example, in the example shown in FIG. 4(b), the average GC time interval is 100 seconds which is found by the calculation:

(100+50+100+150+100)/5.

In the description above, the average recovered memory amount and the average GC time interval are determined from a simple average but these values may also be found by means of another method such as exponential smoothing.

Next, the apparent wait time after which the required size can be acquired is found using the average recovered memory amount thus calculated (step S7 of FIG. 3). This wait time is the predicted wait time at which it will probably be possible to acquire memory of the required size upon waiting for this length of time. Specifically, this wait time is determined by dividing the required size by the average recovered memory amount. For example, in the example shown in FIG. 4(b), when the required size is 7 MB, the wait time is 50 seconds, which is found from 7/0.14.

Thereafter, a judgment is made of whether or not the memory shortage state generated is temporary on the basis of the wait time determined above (step S8 of FIG. 3). Specifically, in cases where the determined wait time is equal to or less than the average GC time interval found in step S6, it is judged that the memory shortage state is a temporary one, but otherwise that a chronic memory shortage state exists.

In cases where a chronic memory shortage state is judged to exist ("No" in step S8 of FIG. 3), because, as described above, the probability of being able to acquire memory of the required size even by waiting is low, error processing is immediately executed as was the case conventionally (step S9 of FIG. 3). Specifically, an error message to the effect that a memory shortage exists is outputted to the business task execution section 30 to terminate the business task pertaining to the business task section 32 that made the memory acquisition request. Upon receiving this error message, the business task manager 31 of the business task execution section 30 transmits an error message that there is a memory shortage to the client 4 of the user 5 that made the business task usage request, and reactivates the terminated business task with predetermined timing.

On the other hand, when the judgment is made that a temporary memory shortage state exists, because the probability is high of being able to acquire the desired memory by waiting for the duration of a wait time which is a predicted wait time at which it will probably be possible to acquire memory of the required size, waiting for the duration of the wait time takes place rather than error processing. Because there are also cases where it is judged that memory cannot be acquired after the wait time which is based on prediction has elapsed, and processing is prolonged in cases of a long wait time, memory acquisition is re-attempted (retried) after waiting for the duration of this wait time when the following two conditions are satisfied.

The first of these conditions is that the wait time should be equal to or less than a preset maximum wait time. The maximum wait time is a maximum time (60 seconds, for example) during which waiting is possible, a value suited to the environment in question being appropriately set.

Further, the second condition is that the retry frequency should be less than a maximum retry frequency. Here, the retry frequency is the frequency with which memory acquisition is re-attempted after waiting for the duration of the wait time, rather than performing error processing, even in the event of a memory shortage state, for a single memory acquisition request. In other words, the frequency with which the judgment in step S8 of FIG. 3 yields a "Yes" and the processing of steps S10 to S3 is performed. This retry frequency is recorded in a retry counter which is resident in the memory 12, and has a value of "0" in an initial state, this value being incremented in steps of 1 each time the judgment in step S8 yields a "Yes". Then, at the point when the memory allocation processing for one memory acquisition request ends, that is, at the point when the processing of step S11 or step S9 of FIG. 3 is performed, this value is reset to "0".

Further, the maximum retry frequency establishes the frequency with which a retry, which re-attempts memory acquisition after waiting for the duration of the wait time, is permissible, and an appropriate value (such as three times, for example) is preset. Setting these two conditions prevents endless repetition of this processing.

In cases where a temporary memory shortage is judged to exist, the judgment is made to perform the retry if the above-described two conditions are also satisfied ("Yes" instep S8 of FIG. 3), and in cases where the above two conditions are not satisfied even when a temporary memory shortage is judged to exist, error processing is executed ("No" in step S8 of FIG. 3 to S9) similarly to a case where it is judged that a chronic memory shortage state exists.

In cases where the judgment is made to perform a retry, CC processing is performed once again (step S3 of FIG. 3) after waiting for the duration of the determined wait time (step S10 of FIG. 3). Thereafter, the above-described processing is executed until memory is acquired in step S11 or error processing is performed in step S9. In the GC processing following the wait (step S10 in FIG. 3), in cases where adequate free capacity is secured and the judgment is made in the check of step S5 that memory can be acquired, the user 5 is provided with the service and the user 5 is thus able to employ the business task of the business task server 1 by waiting for a short time, as described above. Therefore, even if a memory shortage state exists immediately following the request, the request of the user 5 is not denied by error processing, and the service can thus be provided. The memory allocation processing of the memory management section 20 with respect to one memory acquisition request thus ends.

Figure 5:
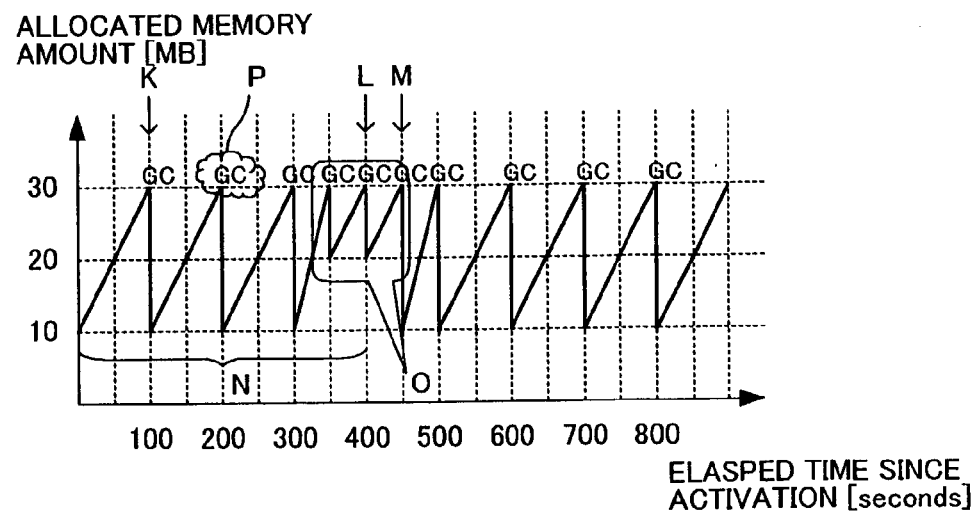
FIG. 5 illustrates a variation in the allocated memory amount of the business task server 1.
Figure 12:
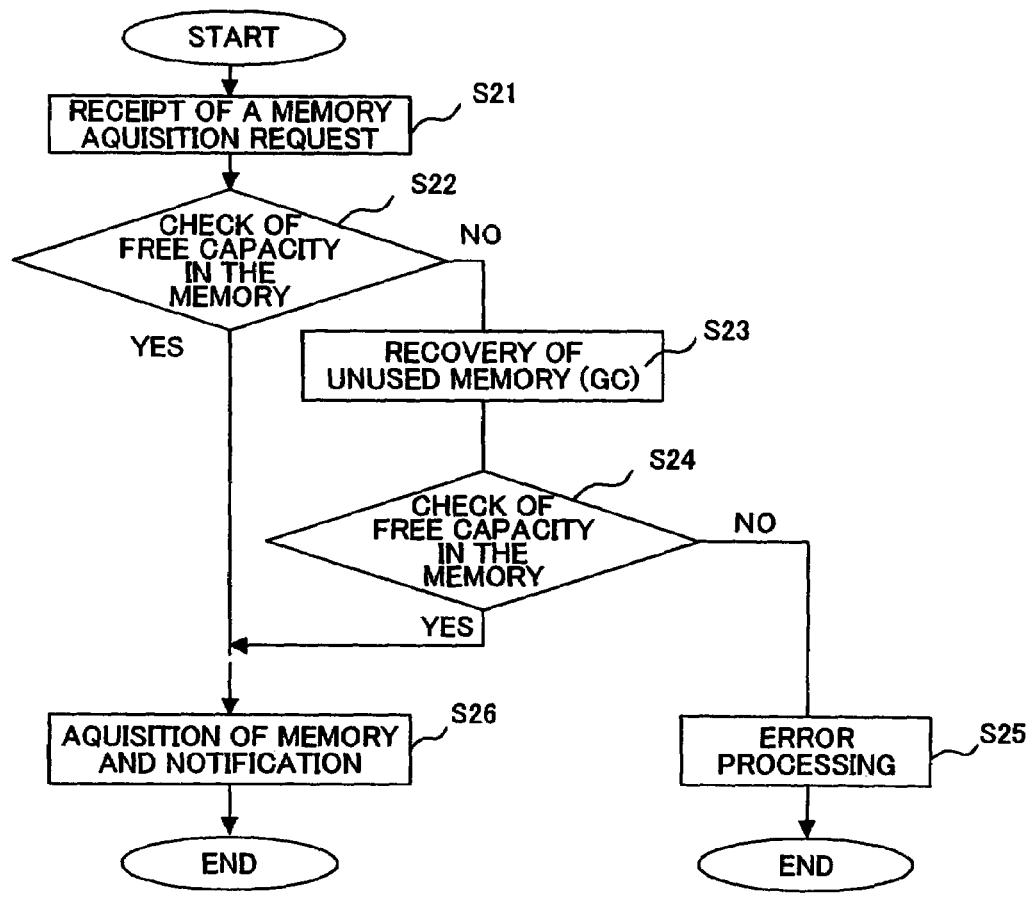
FIG. 12 illustrates a conventional memory allocation method.

Next, an embodiment of the memory allocation processing described above will be illustrated. First, a description will be provided for an example of the operation of the memory management section 20 for a case where a temporary memory shortage state is generated. FIG. 5 illustrates a variation in the allocated memory amount of the business task server 1. The horizontal axis of the figure represents the elapsed time since activation of the business task server 1. The vertical axis represents the allocated memory amount. "GC", as shown in section P in the figure, indicates that GC processing is performed at this time. For example, it can be seen that, in section P, the allocated memory amount is reduced from 30 MB to 10 MB by means of GC processing, thereby recovering 20 MB. Also, in this example, the assumption is made that memory is allocated until the allocated memory amount is 30 MB.

First, suppose that an 11 MB memory acquisition request is received when the elapsed time is 100 seconds (section K in FIG. 5). Here, the allocated memory amount is 30 MB and there is no allocated memory free capacity, and thus GC processing (step S3 of FIG. 3) is executed. Then, as shown in FIG. 5, 20 MB of memory are recovered, and GC processing information is recorded in the GC information table 21 (step S4 of FIG. 3).

FIG. 6 shows an example of the GC information table 21 after such recording. The GC information shown in section Q of FIG. 6 is recorded on this occasion, and is for GC processing that is first after activation when the elapsed time is 100 seconds, and thus 100 seconds is recorded as "elapsed time since activation" and 100 seconds is similarly recorded as "elapsed time since previous GC". Also, 20 MB of memory are recovered and therefore 20 MB is recorded as the "memory amount recovered in GC". Also, as shown in section R of FIG. 6, "location for next recording" is updated to "second".

Next, a free capacity check (step S5 of FIG. 3) is performed once again, and, this time, in response to an 11 MB request, because a free capacity of 20 MB exists, the judgment is made that memory can be acquired and memory acquisition processing is performed (step S11 of FIG. 3). Thereupon, as described hereinabove, the retry frequency is reset to "0", and the start address of the acquired memory is communicated to the source of the request.

A description follows for a case where an 11 MB memory acquisition request is similarly received when the elapsed time is 400 seconds (section L of FIG. 5). Here too, the allocated memory amount is 30 MB and there is no allocated memory free capacity, and thus GC processing (step S3 of FIG. 3) is executed. Then, as shown in FIG. 5, 10 MB of memory are recovered, and GC processing information is recorded in the GC information table 21 (step S4 of FIG. 3).

FIG. 7 shows an example of the GC information table 21 following such recording. The GC information shown in section S of FIG. 7 is recorded on this occasion, and 400 seconds is recorded as "elapsed time since activation" and, as may be seen from FIG. 5, 50 seconds is also recorded as "elapsed time since previous GC" because GC processing is performed 50 seconds after the previous GC processing. Also, 10 MB of memory are recovered and therefore 10 MB is recorded as the "memory amount recovered in GC". Also, as shown in section T of FIG. 7, "location for next recording" is updated to "first". In this embodiment, the "maximum recording frequency" is 5, and thus GC information corresponding to the past 5 times including GC information for this occasion, that is, the information in section N of FIG. 5, is recorded in the GC information table 21 and is used in subsequent processing.

Next, a free capacity check is performed once again (step S5 of FIG. 3) and because, this time, there is a free capacity of only 10 MB for a request for 11 MB, the judgment is made that memory cannot be acquired, and processing moves to analysis processing of GC information (step S6 of FIG. 3). In such processing, as described above, the average recovered memory amount and the average GC time interval are calculated. First, the average recovered memory amount is determined by performing the calculation (20+20+20+ 10+10)/(100+100+100+50+50) using the values shown in sections U and V of FIG. 7, which gives the average recovered memory amount a value of 0.2 MB per second. Further, the average GC time interval is determined by performing the calculation (100+100+100+50+50)/5 using the values shown in section U of FIG. 7, which gives the average GC time interval a value of 80 seconds.

When the above processing is complete, the above-described wait time is calculated (step S7 of FIG. 3). Specifically, 11 MB, which is the required size on this occasion, is divided by the average recovered memory amount 0.2 MB per second as determined above, meaning that the wait time is 55 seconds.

Processing then moves to a retry judgment (step S8 of FIG. 3), whereupon a check is made of whether the three conditions detailed above are all satisfied. First, the wait time of 55 seconds and the average GC time interval of 80 seconds are compared, and it is confirmed that the wait time is equal to or less than the average GC time interval. Next, supposing that the maximum wait time in this embodiment is 60 seconds, and that the maximum retry frequency is three, it can be confirmed that the wait time of 55 seconds is equal to or less than the maximum wait time, and it can also be confirmed that the retry frequency is less than the maximum retry frequency from the fact that a retry has not yet been performed and the retry frequency at this point is therefore "0". Thus all three conditions are satisfied and the result of the retry judgment is "Yes".

Thereafter, the retry frequency is increased by 1 to become "1" and waiting takes place for the duration of the wait time (55 seconds) (step S10 of FIG. 3). Then, after the wait time has elapsed (section M in FIG. 5), GC processing is executed once again (step S3 in FIG. 3). Then, as shown in FIG. 5, 20 MB of memory are recovered, and the information for this GC processing is recorded in the GC information table 21 (step S4 of FIG. 3).

FIG. 8 shows an example of the GC information table 21 following such processing. The GC information shown in section W of FIG. 8 is recorded on this occasion, and 455 seconds is recorded as "elapsed time since activation" and 55 seconds is recorded as "elapsed time since previous GC". Further, because 20 MB of memory are recovered "20 MB" is recorded as "memory account recovered in GC". Also, as shown in section "X" of FIG. 8, the "location for next recording" is updated to "second".

Next, a free capacity check is performed once again (step S5 in FIG. 3) and, in response to a request for 11 MB on this occasion, the judgment is made that memory can be acquired because a free capacity of 20 MB has been obtained, whereupon memory acquisition processing is performed (step S11 of FIG. 3). Thereupon, as described above, the retry frequency is reset to "0", and the start address of the acquired memory is communicated to the source of the request. Thus, at the point when the memory acquisition request was made, that is when the elapsed time since activation is 400 seconds, even if the memory shortage state still exists, by waiting for 55 seconds, memory allocation is completed without error processing being performed.

As is also clear from FIG. 5, the state of the embodiment described above can be said to be a state where 20 MB of memory are secured regularly by GC processing. It can therefore be said that an 11 MB memory acquisition request does not normally engender a memory shortage and that the generation of a memory shortage state (section O in FIG. 5) in the above-described 400 seconds of elapsed time (section L in FIG. 5) is temporary. In this case, therefore, the probability of being able to acquire memory by waiting a short while is high, and immediately executing error processing following the generation of a memory shortage state as performed conventionally is unreasonable. As described hereinabove, the business task server 1 according to the present embodiment judges the memory shortage state as temporary, and succeeds in acquiring memory and can therefore be said to improve the level of service to the user 5.

A description will be provided next for an example of the operation of the memory management section 20 in a case where a chronic memory shortage state is generated. FIG. 9 shows another example of a variation in the allocated memory amount of the business task server 1. The view of this figure is like that of FIG. 5. In this example too, the assumption is made that memory is allocated until the allocated memory amount is 30 MB, and that the required size of the memory acquisition request is 11 MB.

First, suppose that a memory acquisition request is received when the elapsed time is 100 seconds (section AA in FIG. 9). Here, the allocated memory amount is 30 MB, and there is no allocated memory free capacity, and GC processing (step S3 of FIG. 3) is therefore executed. Then, as shown in FIG. 9, 20 MB of memory are recovered, and information for the GC processing is recorded in the GC information table 21 (step S4 of FIG. 3).

FIG. 10 shows an example of the GC information table 21 following such recording. The GC information shown in section EE of FIG. 10 is recorded on this occasion. As shown in section FF of FIG. 10, "location for next recording" is updated to "second".

Next, a free capacity check (step S5 of FIG. 3) is performed once again, and, this time, in response to an 11 MB request, because a free capacity of 20 MB exists, the judgment is made that memory can be acquired and memory acquisition processing is performed (step S11 of FIG. 3). Thereupon, as described hereinabove, the retry frequency is reset to "0", and the start address of the acquired memory is communicated to the source of the request.

A description follows for a case where an 11 MB memory acquisition request is similarly received when the elapsed time is 650 seconds (section BB of FIG. 9). Here too, the allocated memory amount is 30 MB and there is no allocated memory free capacity, and thus GC processing (step S3 of FIG. 3) is executed. Then, as shown in FIG. 9, 10 MB of memory are recovered, and GC processing information is recorded in the GC information table 21 (step S4 of FIG. 3).

FIG. 11 shows an example of the GC information table 21 following recording. GC information shown in section GG of FIG. 11 is recorded on this occasion. Also, as shown in section HH in FIG. 11, "location for next recording" is restored to "first". In this embodiment also, the "maximum recording frequency" is five, and therefore GC information corresponding to the last five times that contains the GC information on this occasion, that is, the information in section CC of FIG. 9, is recorded in the GC information table 21, and is employed in subsequent processing.

Next, a free capacity check is performed once again (step S5 of FIG. 3) and because, this time, there is a free capacity of only 10 MB for a request for 11 MB, the judgment is made that memory cannot be acquired, and processing moves to analysis processing of GC information (step S6 of FIG. 3). In such processing, as described above, the average recovered memory amount and the average GC time interval are calculated. Then, the average recovered memory amount is determined by performing the calculation (10+10+10+10+10)/(50+50+50+50+50) using the values shown in sections II and JJ of FIG. 11, which gives the average recovered memory amount a value of 0.2 MB per second. Further, the average GC time interval is determined by performing the calculation (50+50+50+50+50)/5 using the values shown in section II of FIG. 11, which gives the average GC time interval a value of 50 seconds.

When the above processing is complete, the above-described wait time is calculated (step S7 of FIG. 3). 11 MB, which is the required size, is divided by the average recovered memory amount 0.2 MB per second as determined above, meaning that the wait time is 55 seconds.

Processing then moves to a retry judgment (step S8 of FIG. 3), whereupon the wait time of 55 seconds and the average GC time interval of 50 seconds are compared, and on this occasion the wait time is not equal to or less than the average GC time interval, which does not satisfy the first condition. Therefore, as described above, the memory shortage state generated is judged to be chronic, and the judgment is made to not perform a retry without checking the other two conditions. Thus, memory acquisition is abandoned, and error processing (step S9 of FIG. 3) is immediately executed. Thus, at the point when the memory acquisition request was made, that is when the elapsed time is 650 seconds, the memory shortage state is chronic, and as a consequence error processing is executed as was the case conventionally.

As can also be seen from FIG. 9, it can be said that the state in the embodiment described above is a state in which, at the stage from when the elapsed time is equal to or more than 350 seconds (section DD in FIG. 9), only 10 MB of memory can be regularly secured by performing GC processing. Thus, the memory shortage remains for an 11 MB memory acquisition request, and it is clear that a chronic memory shortage state has been assumed that makes the acquisition of memory difficult even after waiting. Hence, in a case such as this, error processing, which is performed immediately after the generation of a memory shortage state as was the case conventionally, is reasonable, and similar processing is performed in the business task server 1 according to the present embodiment, as described hereinabove.

As described hereinabove, as a result of using the business task server 1 according to the present embodiment, even if a memory shortage state is generated when a business task usage request has been made by the user 5, depending on the status of this memory shortage state, this request is not denied and the user 5 is thus able to use the desired business task as is by waiting for a short while. Therefore, instances where the user abandons usage, or repeats a business task usage request operation, and so forth, are reduced over the prior art, whereby service for the user 5 can be improved and usability for the user 5 enhanced.

The scope of protection of the present invention is not limited to or by the above embodiment, but instead is intended to cover the inventions appearing in the claims as well as any equivalents thereof.

According to the present invention hereinabove, in a state of temporary memory shortage, in principle, error processing is not performed instantly, and memory can sometimes be acquired by waiting a short while. It is thus possible to reduce instances where a user wishing to use an application abandons usage, or performs a repeated usage request operation, and so forth, whereby user usability as well as the level of service for the user can be improved.

What is claimed is:

1. A memory allocation method for allocating memory in accordance with a memory acquisition request which allocates memory of a required size determined by the request, wherein in cases where, upon receiving the memory acquisition request, memory of the required size cannot be acquired even by executing memory recovery processing to recover unused memory, the memory allocation method comprises:

a first step of judging whether or not to retry the memory acquisition on the basis of memory recovery information relating to past memory recovery processing, and the required size;

a second step of communicating the fact that the memory cannot be acquired to a request source of the memory acquisition request when a judgment is made to not retry the memory acquisition;

and a third step of executing the memory recovery processing once again after a predetermined time interval has elapsed to thereby retry the memory acquisition when a judgment is made to retry the memory acquisition.

2. The memory allocation method as claimed in claim 1, wherein the memory recovery information includes the executed time of the memory recovery processing, and the memory recovery amount; and the predetermined time interval is a time interval determined on the basis of the memory recovery information and the required size, and is a predicted wait time for which it is predicted that memory of the required size can be acquired after the time interval has elapsed.

3. A memory allocation method for allocating memory in accordance with a memory acquisition request which allocates memory of a required size determined by the request, wherein, in cases where memory of the required size cannot be acquired at the point when the memory acquisition request is received, the memory allocation method comprises:

a first step of executing memory recovery processing to recover unused memory;

a second step of judging whether or not it is possible to acquire memory of the required size after the first step;

a third step of acquiring memory of the required size when a judgment is made in the second step that the memory can be acquired;

a fourth step of judging whether or not to retry the memory acquisition on the basis of memory recovery information relating to past memory recovery processing, and the required size, when a judgment is made in the second step that memory cannot be acquired;

a fifth step of communicating the fact that the memory cannot be acquired to a request source of the memory acquisition request when a judgment is made in the fourth step to not retry the memory acquisition;

and a sixth step of repeating the processing starting from the first step after a predetermined time interval has elapsed, when a judgment is made in the fourth step to retry the memory acquisition.

4. The memory allocation method as claimed in claim 3, wherein the memory recovery information includes the executed time of the memory recovery processing, and the memory recovery amount; the fourth step comprises a predicting step of determining a expected memory recovery time until the next memory recovery processing will be performed, on the basis of the executed time of the memory recovery information, and determining a predicted wait time permitting memory of the required size to be acquired, on the basis of the memory recovery information and the required size, and a judging step of judging whether or not to retry the memory acquisition on the basis of the expected memory recovery time and the predicted wait time; and the predetermined time interval in the sixth step is the predicted wait time.

5. The memory allocation method as claimed in claim 4, wherein the judgment in the judging step of whether or not to perform the retry is performed at least on the basis of a condition that the predicted wait time is equal to or less than the expected memory recovery time.

6. A computer readable medium recording a program that causes a computer to execute processing to allocate memory in accordance with a memory acquisition request which allocates memory of a required size determined by the request, wherein in cases where, upon receiving the memory acquisition request, memory of the required size cannot be acquired even by executing memory recovery processing to recover unused memory, said processing comprising:

a first step of judging is whether or not to retry the memory acquisition on the basis of memory recovery information relating to past memory recovery processing, and the required size;

a second step of communicating the fact that the memory cannot be acquired to a request source of the memory acquisition request when a judgment is made to not retry the memory acquisition;

and a third step of executing the memory recovery processing once again after a predetermined time interval has elapsed to thereby retry the memory acquisition when a judgment is made to retry the memory acquisition.

7. A computer readable medium as claimed in claim 6, wherein the memory recovery information includes the executed time of the memory recovery processing, and the memory recovery amount; and the predetermined time interval is a time interval determined on the basis of the memory recovery information and the required size, and is a predicted wait time for which it is predicted that memory of the required size can be acquired after the time interval has elapsed.

8. A computer readable medium recording a program that causes a computer to execute processing to allocate memory in accordance with a memory acquisition request and which allocates memory of a required size determined by the request, wherein, in cases where memory of the required size cannot be acquired at the point when the memory acquisition request is received, said processing comprising:

a first step of executing memory recovery processing to recover unused memory;

a second step of judging whether or not it is possible to acquire memory of the required size after the first step;

a third step of acquiring memory of the required size when a judgment is made in the second step that the memory can be acquired;

a fourth step of judging whether or not to retry the memory acquisition on the basis of memory recovery information relating to past memory recovery processing, and the required size, when a judgment is made in the second step that memory cannot be acquired;

a fifth step of communicating the fact that the memory cannot be acquired to a request source of the memory acquisition request when a judgment is made in the fourth step to not retry the memory acquisition;

and a sixth step of repeating the processing starting from the first step after a predetermined time interval has elapsed, when a judgment is made in the fourth step to retry the memory acquisition.

9. A computer readable medium as claimed in claim 8, wherein the memory recovery information includes the executed time of the memory recovery processing, and the memory recovery amount; the fourth step comprises a predicting step of determining a expected memory recovery time until the next memory recovery processing will be performed, on the basis of the executed time of the memory recovery information, and determining a predicted wait time permitting memory of the required size to be acquired, on the basis of the memory recovery information and the required size, and a judging step of judging whether or not to retry the memory acquisition on the basis of the expected memory recovery time and the predicted wait time; and the predetermined time interval in the sixth step is the predicted wait time.

10. A computer readable medium as claimed in claim 9, wherein the judgment in the judging step of whether or not to perform the retry is performed at least on the basis of a condition that the predicted wait time is equal to or less than the expected memory recovery time.

* * * * *